United States Patent [19]

Harmuth

[11] 4,046,728

[45] Sept. 6, 1977

[54] POLYVINYL CHLORIDE TERPOLYMER POWDER COATING COMPOSITION

[75] Inventor: Charles M. Harmuth, Wilmington, Del.

[73] Assignee: E. I. Du Pont de Nemours and Company, Wilmington, Del.

[21] Appl. No.: 645,388

[22] Filed: Dec. 30, 1975

[51] Int. Cl.² ........................................... C08L 23/08
[52] U.S. Cl. ........................... 260/28.5 A; 260/28.5 D; 260/31.8 M; 260/42.21; 260/42.22; 260/42.49; 260/45.8 N; 260/45.75 K; 260/45.85 R; 260/45.95 C; 260/837 PV; 428/463
[58] Field of Search ........................... 260/897 C, 28.5

[56] References Cited

U.S. PATENT DOCUMENTS

| | | | |
|---|---|---|---|
| 3,640,928 | 2/1972 | Marayme et al. | 260/23 XA |
| 3,790,140 | 12/1973 | Hammer | 260/884 |
| 3,842,027 | 10/1974 | Richardson | 260/31.8 R |

OTHER PUBLICATIONS

DuPont - Products Bulletin, P B Permanent Plasticizers, 1/75.

Primary Examiner—Carman J. Seccuro

[57] ABSTRACT

A powder coating composition of powder particles having a size range of about 1–100 microns in which the powder particles are a blend of A. a polyvinyl chloride terpolymer of vinyl chloride/vinyl acetate/maleic acid and B. a polymer of ethylene/vinyl acetate/carbon monoxide;

the powder can contain in addition to the above polymers a heat stabilizer such as a organometallic mercaptide, an epoxy resin, pigments, plasticizers, ultraviolet light-absorbing agents, polyethylene wax and a hard polymer such as an acrylic polymer; the powder coating composition is useful as a finish for metals such as tubing, wires, fence posts, lawn furniture, play equipment and the like.

11 Claims, No Drawings

POLYVINYL CHLORIDE TERPOLYMER POWDER COATING COMPOSITION

BACKGROUND OF THE INVENTION

This invention is related to powder coating compositions and in particular to a polyvinyl chloride containing powder coating composition.

Power coating compositions are well known in the art and have been used in the place of conventional solvent and water-based paints to coat a variety of different substrates. Polyvinyl chloride powder coatings are broadly used and well known as shown by Richardson U.S. Pat. No. 3,842,027 issued Oct. 15, 1974. These polyvinyl chloride powder coatings are applied by conventional fluid bed or electrostatic spray techniques. However, these polyvinyl chloride powders agglomerate and lose free flow characteristics when exposed to heat and pressure in storage or in application equipment. When this occurs, additional sieving or mixing of the powder is required to achieve uniform application of the powder on substrates.

Another deficiency of the polyvinyl chloride powders is that finishes of the powders have reduced impact and bend resistance particularly at low temperatures which may make the powders unacceptable for certain end uses.

SUMMARY OF THE INVENTION

The powder coating composition is of powder particles having a particle size range of about 1–100 microns; wherein the powder particles are a blend of the following:

A. 75–90% by weight of a polyvinyl chloride terpolymer of
 1. 72–87% by weight, based on the weight of the terpolymer, of vinyl chloride,
 2. 10–25% by weight based on the weight of the terpolymer, of vinyl acetate and
 3. 0.1–3% by weight, based on the weight of the terpolymer of maleic acid;
wherein the terpolymer has a weight average molecular weight of about 20,000–125,000 and B. 10–25% by weight of a polymer of
 1. 50–80% by weight, based on the weight of the polymer, of ethylene,
 2. 15–35% by weight, based on the weight of the polymer of vinyl acetate, and
 3. 5–15% by weight, based on the weight of the polymer, of carbon monoxide;
wherein the polymer has a weight average molecular weight of about 100,000–400,000.

DESCRIPTION OF THE INVENTION

The powder coating composition of this invention has excellent flowability even after exposure to moderate heat and pressure conditions that exist in storage and in the operation of conventional application equipment. Also, finishes of the powder have excellent impact and bend resistance at low temperature.

The powder composition is of powder particles that have a particle size range of about 1–100 microns. Smaller particles can be present since no effort is made to remove particles under 1 micron after the powder is passed through a sieve to remove large particles.

About 75–90% by weight of the powder coating composition is of a polyvinyl chloride terpolymer or a mixture of these terpolymers. The terpolymer is of about 72–87% by weight of vinyl chloride, 10–25% by weight of vinyl acetate and 0.1–3% by weight of maleic acid. One preferred terpolymer that forms a high quality powder is of about 77–82% by weight vinyl chloride, 17–22% by weight of vinyl acetate and 1–2% by weight of maleic acid. One particularly preferred terpolymer has a weight ratio of vinyl chloride/vinyl acetate/maleic acid of 80/20/1.

The polyvinyl chloride terpolymer has a weight average molecular weight of about 20,000–125,000 and preferably about 40,000–80,000. The weight average molecular weight is determined by gel permeation chromatography using polystyrene as a standard.

About 10–25% by weight of the powder coating composition is of a polymer of 50–80% by weight of ethylene, 15–35% by weight of vinyl acetate and 5–15% by weight of carbon monoxide. One useful polymer is of 56–76% by weight ethylene, 10–34% by weight of vinyl acetate and 5–14% by weight of carbon monoxide. The polymer has an average molecular weight of about 100,000–400,000 and preferably about 200,000–300,000. The molecular weight is determined by the above technique. Preparation of these polymers is disclosed in Hammer U.S. Pat. No. 3,780,140 issued Dec. 18, 1973 which is hereby incorporated by reference.

The powder coating composition is usually pigmented and contains pigment in a pigment to binder ratio of about 0.1:100 to about 75:100. The binder is the film-forming constituents in the composition.

Any of the conventional pigments can be used, for example, metallic oxides such as titanium dioxide, iron oxide, zinc oxide nd the like, sulfates, carbonates, carbon black, organic pigments such as phthalocyanine blue and green pigments; titanates such as chrome antimony titanate, silica, talc, china clay, metallic flakes such as aluminum flake, metallic powders, metallic hydroxides, "Afflair" pigments such as mica coated with titanium dioxide and a variety of other inorganic, organic pigments, dyes and lakes. One particularly useful combination of pigments is a mixture of titanium dioxide, carbon black, copper phthalocyanine green, barium sulfate and a fusion pigment of titanium/antimony/chrome.

The powder coating can contain about 1–5% by weight of a heat stabilizer such as an organometallic mercaptide. Usually a butyl tin mercaptide is used. One particularly useful mercaptide is a mixture of monobutyl tin mercaptide and dibutyl tin mercaptide. This mixture provides thermostability to the powder coating composition. The preferred mixture has an approximate tin content of 21–25% and an approximate sulfur content of 9–12%. A more preferred mixture has an approximate tin content of 23.5%; approximate sulfur content of 10.5%; and viscosity, measured by ASTM-1545-63, of about B.

The coating can contain about 1–10% by weight of a low molecular weight epoxyhydroxy polyether resin to improve heat stability of the powder. One useful resin is of the formula

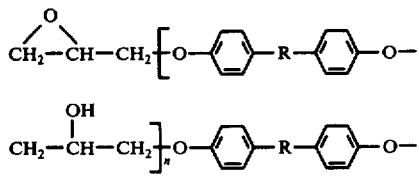

-continued

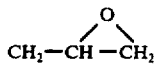

where R is an alkylene group and $n$ is an integer sufficiently large to provide a molecular weight of about 300 to 600. In one particularly useful resin R is

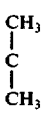

or $CH_2$. A preferred epoxy resin of the above type is the reaction product of bisphenol A and epichlorohydrin having an epoxide equivalent of about 180-200 where R is

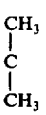

Epoxide equivalent is the grams of resin containing one gram equivalent of epoxide.

An ultraviolet light-absorbing agent can be incorporated into the coating composition in an amount of about 0.1-2% by weight. Substituted benzotriazoles, benzophenones, benzoates and acrylonitriles are typically useful ultraviolet light-absorbing agents.

Typically useful substituted benzophenones have the structural formula

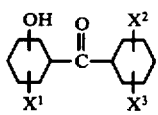

where $X^1$, $X^2$ and $X^3$ are individually selected from the group of hydrogen, hydroxyl, alkyl, alkoxy and halogen. One useful benzophenone is 4-dodecyloxy-2-hydroxy benzophenone. A particularly useful benzophenone is 2-hydroxy-4-n-octoxy benzophenone.

Typical substituted benzotriazoles have the general formula

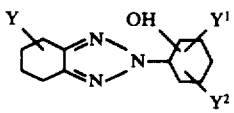

where Y, $Y^1$ and $Y^2$ are individually selected from the group of hydrogen, hydroxyl, alkyl and halogen.

One useful benzotriazole is 2-(2'-hydroxy-5'-methyl phenyl) benzotriazole. Others are disclosed in U.S. Pat. Nos. 3,640,928, 3,004,896 and 3,189,615.

Typically useful substituted acrylonitriles are ethyl-2-cyano-3,3-diphenyl acrylate and 2-ethylhexyl-2-cyano 3,3 diphenyl acrylate.

A typically useful substituted benzoate is 2,4-di-t-butyl phenyl 3,5-di-t-butyl-4-hydroxy benzoate.

Low molecular polyethylene wax in an amount of about 0.1-1% by weight can also be used in the coating composition.

To improve grinding of the powder, which is a step used in preparation of the powder, about 0.5-20% by weight of a hard polymer such as polymethyl methacrylate and copolymers thereof, cellulose acetate butyrate and the like are used. One polymer is of methyl methacrylate/butyl methacrylate/methacrylic acid having a weight average molecular weight of 20,000-40,000. The polymer is of about 60 to 95% methyl methacrylate, about 3.5 to 4.7% butyl methacrylate and about 0.3-5% methacrylic acid.

Plasticizers in particular ester plasticizers can be added to the composition in amounts of about 1-12%, by weight. Typically useful plasticizers are disclosed in Col. 2, lines 41-60, of the above-mentioned U.S. Pat. No. 3,842,027. This portion of the patent is incorporated by reference. One preferred plasticizer which forms a high quality powder is triisodecyl trimellitate.

One preferred powder coating composition that utilizes the above constituents and that provides a flowable, nonsticking powder and forms finishes on metals that have excellent impact and bend resistance at low temperatures is a blend of the following constituents:

A. 40-86.3% by weight of a polyvinyl chloride terpolymer of 77-82% by weight of vinyl chloride, 17-22% by weight of vinyl acetate, 1-2% by weight of maleic acid, B. 10-25% by weight of a polymer of 56-76% by weight of ethylene, 10-34% by weight of vinylacetate and 5-14% by weight of carbon monoxide, C. 1-15% by weight of an organometallic mercaptide such as a butyl tin mercaptide, D. 1-10% by weight of a low molecular weight epoxyhydroxy polyether resin, E. 0.1-2% by weight of an ultraviolet light-absorbing agent of a substituted benzophonone, a substituted benzotriazole, a substituted benzoate or a substituted acrylonitrile, F. 0.1-1% by weight of a low molecular weight polyethylene wax, G. 0.5-20% by weight of a methyl methacrylate polymer such as a polymer of methyl methacrylate/butyl methacrylate/methacrylic acid and H. 1-12% by weight of an ester plasticizer such as triisodecyl trimellitate.

One method for preparing the powder coating composition of this invention is to blend the above constituents and then pass the blend through a conventional extruder. Another method is to charge the above constituents onto a two-roll mill having one roll heated to about 80°-100° C and the other roll at the ambient temperature and melt blend the constituents together. The composition resulting from either of the above methods is formed into a powder by grinding in conventional grinding equipment under low temperatures; e.g., a pin disc mill, a fluid energy mill, or a hammer mill. Either dry ice or liquid nitrogen can be used to attain a low grinding temperature. After grinding, the powder is passed through a sieve to remove large particles. Usually a 140 mesh sieve is used.

Application of the Powder Coating Composition

The powder coating composition of this invention can be applied to hot or cold metal substrates by utilizing fluidized bed or electrostatic spray techniques. Preferably, electrostatic spraying is utilized in which a voltage of 20-100 kilovolts is applied to a spray gun. The powder coating composition is applied in several passes to provide a thickness after fusion of 1-10 mils, preferably 2-4 mils. The coating is baked, for example, at 175°–210° C for 3 to 5 minutes, to fuse the powder particles into a continuous, uniform, smooth and glossy coating.

The powder coating composition of this invention can be applied to untreated metal substrates. Also, the composition can be used directly over galvanized steel, phosphatized steel or aluminum.

The powder coating composition is useful for providing finishes on the metal exteriors of products such as tubing, wires, fence posts, lawn furniture and the like.

The following example illustrates the invention. All quantities are on a weight basis unless otherwise indicated.

EXAMPLE 1

The following ingredients are blended together:

|  | Parts by Weight |
|---|---|
| Polyvinyl chloride terpolymer (vinyl chloride/vinyl acetate/maleic anhydride polymer in a weight ratio of 80/20/1 and having a weight average molecular weight of 65,000) | 100.0 |
| Plasticizer Resin (ethylene/vinyl acetate/carbon monoxide polymer weight ratio of 66/23/11 and a weight average molecular weight of about 250,000) | 25.0 |
| Liquid epoxy resin (epoxyhydroxy polyether resin of epichlorohydrin and bisphenol A having an epoxide equivalent of 182-190 and a viscosity of 11,000-14,000 centipoise at 25° C and a molecular weight of about 364-380) | 5.0 |
| Butyl tin mercaptide (a mixture of monobutyl tin mercaptide and dibutyl tin mercaptide having a tin content of about 23.5% and a sulfur content of about 10.5%) | 3.0 |
| "Bareco" polywax 2000 (low molecular weight polyethylene wax) | 0.5 |
| Ultraviolet light-absorbing agent 2,4-di-t-butyl phenyl 3,5-di-t-butyl-4hydroxy benzoate. | 0.5 |
| Total | 134.0 |

A blend of the above ingredients is charged onto a two-roll mill having one roll at about 85°–95° C and the other roll at room temperature and milled for 20 minutes. The resulting composition is ground into a powder in a pin disc mill cooled to about −72° C with dry ice. The powder is passed through a 140 mesh sieve to remove large particles.

The powder then is sprayed onto phosphatized 24 gauge cold roll steel panels using a Model 222 Ransburg electrostatic powder gun. The gun uses 60 volts of electricity to charge the powder and 60 pounds per square inch air pressure. The coated panels are baked for 5 minutes at 205° C. The resulting finish on each of the panels is about 2-3 mils thick, has excellent adhesion to the substrate, is free from popping and cratering and has a good appearance. The finish has excellent impact resistance as shown by an impact test in which the finish is subjected to an impact of 80 and 160 pounds per square inch. Also, the finish has excellent resistance to corrosion as shown by the salt spray test in which no blisters resulted after 250 hours of exposure to a salt spray and no flaking or peeling of finish from a scribe mark which is through the finish to the metal is noted. The flaking and peeling of the finish is known as "creep". After 1000 hours' exposure to salt spray, 5/16 of an inch of creep from the scribe mark is noted.

EXAMPLE 2

The following ingredients are charged into a Hobart mixer and thoroughly blended together:

|  | Parts by Weight |
|---|---|
| Polyvinyl chloride terpolymer (described in Example 1) | 100.00 |
| Plasticizer resin (described in Example 1) | 25.00 |
| Plasticizer (triisodecyl trimellitate) | 5.00 |
| Liquid epoxy resin (described in Example 1) | 10.00 |
| Butyl tin mercaptide (described in Example 1) | 3.00 |
| Ultraviolet light absorbing agent (2-ethylhexyl-2-cyano-3,3-diphenyl acrylate) | 3.00 |
| "Bareco" polywax 2000 (described in Example 1) | 0.50 |
| Titanium dioxide pigment | 0.35 |
| Carbon black pigment | 0.31 |
| "Monastral" green pigment (copper phthalocyanine pigment) | 3.37 |
| Golden yellow inorganic pigment (fusion pigment of titanium/antimony/chrome) | 6.00 |
| Barium sulfate pigment | 20.00 |
| total | 176.53 |

A blend of the above ingredients is charged onto a two-roll mill where the rolls are at the same temperature as in Example 1 and milled for 20 minutes. The resulting composition is ground into a powder in a pin disc mill cooled to about −72° C with dry ice and the resulting powder is passed through a 140 mesh sieve to remove large particles. The resulting product is a fine flowable powder.

The powder is sprayed onto phosphatized 24 gauge cold roll steel panels using the same electrostatic spray gun as in EXAMPLE 1 and baked as in Example 1. The resulting finish on each of the panels is about 2-3 mils thick, has excellent adhesion to the substrate, is free from popping and cratering and has a good appearance.

Coated panels are subjected to an impact test of 80 inch pounds and 160 inch pounds at 22° C and at −29° C. The results of the impact tests are as follows:

| Temperature | Rating | |
|---|---|---|
|  | 22° C | −29° C |
| 80 inch pounds | 10 | 8 |
| 160 inch pounds | 10 | 7 |

A rate of 10 indicates no failure of the finish at the point of impact and below 5 indicates complete failure of the finish at point of impact.

Coated panels are subjected to a salt spray as in Example 1. No blistering or creep of the finish is noted after 500 and 1000 hours of testing.

Coated panels are tested in a standard weatherometer for 500 hours. The 60° gloss of the coated panels before being placed into the weatherometer is 53 and at the end of the 500-hour test the 60° gloss is 25, which is acceptable.

A panel is subjected to a mandrel bend test in which a panel is bent at a 90° angle over a mandrel at −29° C. No cracking of the finish is noted. This shows that the finish is flexible even at low temperatures.

EXAMPLE 3

Three powder coating compositions A, B, and C, are prepared as follows:

|  | Parts by Weight | | |
|---|---|---|---|
|  | A | B | C |
| Polyvinyl chloride terpolymer (described in Example 1 | 80.00 | 80.00 | 60.00 |
| Plasticizer resin (described in Example 1) | 25.00 | 20.00 | 20.00 |
| Plasticizer (triisodecyl trimellitate) | 5.00 | 12.00 | 18.00 |

-continued

|  | Parts by Weight | | |
|---|---|---|---|
|  | A | B | C |
| Liquid epoxy resin (described in Example 1) | 10.00 | 8.00 | 6.00 |
| Butyl tin mercaptide (described in Example 1) | 3.00 | 2.40 | 1.80 |
| Ultraviolet light absorbing agent (described in Example 2) | 3.00 | 0.40 | 0.30 |
| "Bareco" wax (described in Example 1) | 0.50 | 0.50 | 0.50 |
| Acrylic polymer (methyl methacrylate/butyl methacrylate/methacrylic acid weight ratio 69/30/1 having a weight average molecular weight of about 30,000) | 20.00 | — | 20.00 |
| Titanium dioxide pigment | 0.35 | 0.35 | 0.35 |
| Carbon black pigment | 0.31 | 0.31 | 0.31 |
| "Monastral" green pigment (copper phthalocyanine green pigment) | 3.37 | 3.37 | 3.37 |
| Golden yellow inorganic pigment (described in Example 2) | 6.00 | 6.00 | 6.00 |
| Barium sulfate pigment | 20.00 | 20.00 | 20.00 |
| Total | 176.53 | 153.33 | 156.63 |

Powders coating compositions A, B, and C are prepared by using the same procedure as set forth in Example 2. Each of the resulting powders A, B, and C is fine and flowable. Each of the powders is applied to phosphatized steel panels as in Example 1 and baked as in Example 1. In each case, a finish of about 2-3 mils thick is formed that has excellent adhesion to the substrate and is free from popping and blistering.

Several of the above coated panels are subjected to an impact test as described in Example 2. The following are the results of this test:

| Temperature | Rating | | | | | |
|---|---|---|---|---|---|---|
|  | 22° C | | | −29° C | | |
| Panel | A | B | C | A | B | C |
| 80 inch pounds | 10 | 10 | 10 | 8 | — | — |
| 160 inch pounds | 9 | 10 | 10 | 7 | — | — |

Several of the above coated panels are subjected to a salt spray test as in Example 2. After 500 hours of exposures, no creep or blistering of the finish on the panels is noted. After 1000 hours some small blisters are noted in the finish but no creep.

Several of the above coated panels are subjected to a mandrel bend test as described in Example 2. No cracking or chipping of any of the finish of A, B, or C on the panels is noted.

What is claimed is:

1. A powder coating composition of powder particles having a particle size range of about 1-100 microns; wherein the powder particles consist essentially of a binder of a blend of:
    A. 75-90% by weight of a polyvinyl chloride terpolymer consisting essentially of
       1. 72-87% by weight, based on the weight of the terpolymer, of vinyl chloride,
       2. 10-25% by weight, based on the weight of the terpolymer of vinyl acetate and
       3. 0.1-3% by weight, based on the weight of the terpolymer, of maleic acid;
          wherein the terpolymer has a weight average molecular weight of about 20,000-125,000; and
    B. 10-25% by weight of a polymer consisting essentially of
       1. 50-80% by weight, based on the weight of the polymer, of ethylene,
       2. 15-35% by weight, based on the weight of the polymer of vinyl acetate, and
       3. 5-15% by weight, based on the weight of the polymer, of carbon monoxide;
          wherein the polymer has a weight average molecular weight of about 100,000-400,000;
          wherein the powder particles contain in addition to the binder about 1-5% by weight of a heat stabilizer, 1-10%, by weight of a low molecular weight epoxy hydroxy polyether resin and 0.1-1% by weight of a low molecular weight polyethylene wax.

2. The powder coating composition of claim 1 containing pigments in a pigment to binder ratio of 0.1:100 to about 75:100.

3. The powder coating of claim 2 in which the heat stabilizer is an organometallic mercaptide.

4. The powder coating composition of claim 2 in which the epoxy resin is of bisphenol A and epichlorohydrin.

5. The powder coating composition of claim 2 containing about 0.1-2% by weight of an ultraviolet light-absorbing agent.

6. The coating composition of claim 5 in which the ultraviolet light-absorbing agent is a substituted benzophenone, a substituted benzotriazole, a substituted benzoate or a substituted acrylonitrile.

7. The coating composition of claim 2 containing about 0.5-20% by weight of a methyl methacrylate polymer.

8. The coating composition of claim 2 containing about 1-12% by weight of a plasticizer.

9. The coating composition of claim 8 in which the plasticizer is triisodecyl trimellitate.

10. A powder coating composition of powder particles having a particle size range of about 1-100 microns wherein the powder particles consists essentially of a blend of:
    A. 40-86.3% by weight of polyvinyl chloride terpolymer consisting essentially of
       1. 77-82% by weight of vinyl chloride,
       2. 17-22% by weight of vinyl acetate,
       3. 1-2% by weight of maleic acid;
    B. 10-25% by weight of a polymer consisting essentially of
       1. 56-76% by weight of ethylene,
       2. 10-34% by weight of vinyl acetate,
       3. 5-14% by weight of carbon monoxide, and
    C. 1-5% by weight of an organometallic mercaptide of a mixture of monobutyl tin mercaptide and dibutyl tin mercaptide,
    D. 1-10% by weight of a low molecular weight epoxyhydroxy polyether resin,
    E. 0.1-2% by weight of an ultraviolet light-absorbing agent of a substituted benzophenone, a substituted benzotriazole, a substituted benzoate or a substituted acrylonitrile,
    F. 0.1-1% by weight of a low molecular weight polyethylene wax,
    G. 0.5-20% by weight of a polymer of methyl methacrylate/butyl methacrylate/methacrylic acid, and
    H. 1-12% by weight of an ester plasticizer.

11. The coating composition of claim 10 in which the polyester plasticizer is triisodecyl trimellitate.

* * * * *